May 21, 1963 B. B. KLEINERMAN 3,090,536

TAPE RECORDER

Filed Sept. 17, 1959 6 Sheets-Sheet 1

INVENTOR.
BENJAMIN B. KLEINERMAN
BY Amster & Levy
ATTORNEYS

INVENTOR.
BENJAMIN B. KLEINERMAN
BY Amster + Levy
ATTORNEYS

INVENTOR.
BENJAMIN B. KLEINERMAN
BY Amster & Levy
ATTORNEYS

May 21, 1963 B. B. KLEINERMAN 3,090,536

TAPE RECORDER

Filed Sept. 17, 1959 6 Sheets-Sheet 4

INVENTOR.
BENJAMIN B. KLEINERMAN
BY Amster & Levy
ATTORNEYS

INVENTOR.
BENJAMIN B. KLEINERMAN
BY Amster & Levy
ATTORNEYS

INVENTOR.
BENJAMIN B. KLEINERMAN
BY Amster & Levy
ATTORNEYS

United States Patent Office 3,090,536
Patented May 21, 1963

3,090,536
TAPE RECORDER
Benjamin B. Kleinerman, 261—62 Langston Ave., Glen Oaks, N.Y.
Filed Sept. 17, 1959, Ser. No. 840,578
2 Claims. (Cl. 226—48)

This invention relates generally to electro-acoustical equipment, and more particularly to an improved tape recorder.

With the advent of transistor technology has come a wide-spread movement toward the miniaturization of all manner of electro-acoustical equipment. One of the principal objects of the trend towards miniaturization of equipment of this nature has been to make such equipment more readily portable, both in the sense of being smaller and lighter and therefore easier to transport, and in the sense of being usable at locations remote from a conventional A.C. power supply. However, owing in part to the great number of mechanical components which must be incorporated into tape recorders and other types of recording and reproducing equipment, progress toward making such equipment smaller and more portable has been hampered.

Accordingly, it is broadly an object of this invention to provide a tape recorder which is small in size, light in weight, and operable in the absence of a conventional A.C. power supply. In particular, it is an object of this invention to provide an improved tape recorder in which the mechanical components and the audio system are both designed for miniaturization and are integrated in a readily portable device. A further object of the invention is to provide a tape recorder of the aforesaid type in which, despite its small size, most of the quality mechanical and acoustical features of much larger tape recorders are found, as will be apparent from the following brief summary of this invention.

In accordance with an illustrative embodiment of a tape recorder in accordance with this invention, the recording tape is fed past a transducer head and there is provided a pressure arm which performs the dual function of pressing the recording tape operatively against the transducer head and against a rotating capstan which drives the tape. When it is desired to suspend the recording or playback operation the pressure arm is lifted away from the recording tape so that it no longer presses the latter into contact with the transducer head and the capstan. However, in order to insure that the tape does not move during the time that the pressure arm is being retracted from its operating position, the pressure pad assembly which presses the recording tape against the transducer head is constructed in a novel manner which enables it to keep on pressing the recording tape against the transducer head during the initial phase of retraction of the pressure arm. This serves to brake the motion of the recording tape until such time when the pressure arm has ceased to press the recording tape into driving engagement with the capstan. The member which presses the recording tape into driving engagement with the capstan is an elastic roller which might take a lasting deformation if it were allowed to remain in pressure contact with the capstan when the later was not rotating. For this reason there is provided a novel interlock mechanism which assures that the rotary motion of the capstan cannot be terminated without also lifting the pressure roller out of contact therewith. One of the problems encountered in providing a variable speed tape recorder drive of the type which includes a flywheel and a transmission wheel positioned with its perimeter in driving contact with the flywheel is that the outer edge of the perimeter of the transmission wheel wears more rapidly than the inner edge thereof, owing to the speed differential of the flywheel between two radially spaced points. Accordingly, as a further novel feature of this invention, there is provided a variable speed drive of this general type in which provision is made for reducing the speed differential between the inner and outer edges of the perimeter of the transmission wheel so as to reduce the uneven wear thereof. As a further novel improvement in variable speed drives of this type, there is provided a spindle which is in driving contact with the aforesaid transmission wheel, the spindle consisting of a number of discrete drive segments of varying diameter which serve to select the proper drive ratio when the transmission wheel is shifted radially across the flywheel. This spindle is provided with chamfers at the boundaries between the adjacent drive segments thereof to facilitate shifting of the transmission wheel across such boundaries. There is further provided in the tape recorder of this invention an improved function-shifting mechanism in which all the realignment of mechanical components necessary for shifting over between the functional phases of rewind, record-playback, and fast forward are accomplished by movement of a single control bar. The rewind functional phase involves the shifting of a rewind assembly into position to transmit power in a selected drive ratio from a motor-driven flywheel to a rewind wheel. The rewind assembly, in order to achieve the desired drive ratio and the proper direction of rotation in accordance with rewind requirements, employs a pair of transmission wheels which are in driving engagement with each other and with the flywheel and the rewind wheel, and as a further novel feature of this invention are arranged so that both transmission wheels are in self-energizing relationship to the flywheel from which they are driven and the rewind wheel which they in turn drive. The electric motor which drives the flywheel is provided with another novel device which is effective to hold the motor at a constant speed in accordance with sound recording and reproducing requirements independently of the varying voltage delivered by the batteries which constitute the D.C. power supply for a portable tape recorder in accordance with this invention. An additional novel feature of this tape recorder is the connection of the erase head in series between the amplifier thereof and the aforesaid D.C. power supply, with the provision of a switching arrangement which automatically short-circuits the erase head during the playback phase of the operation of this tape recorder and automatically energizes the erase head during the recording phase.

The foregoing brief summary of the novel features of the tape recorder of this invention may best be appreciated by reference to the following detailed description thereof, when taken in conjunction with the accompanying drawings, wherein.

Figures 1, 2:
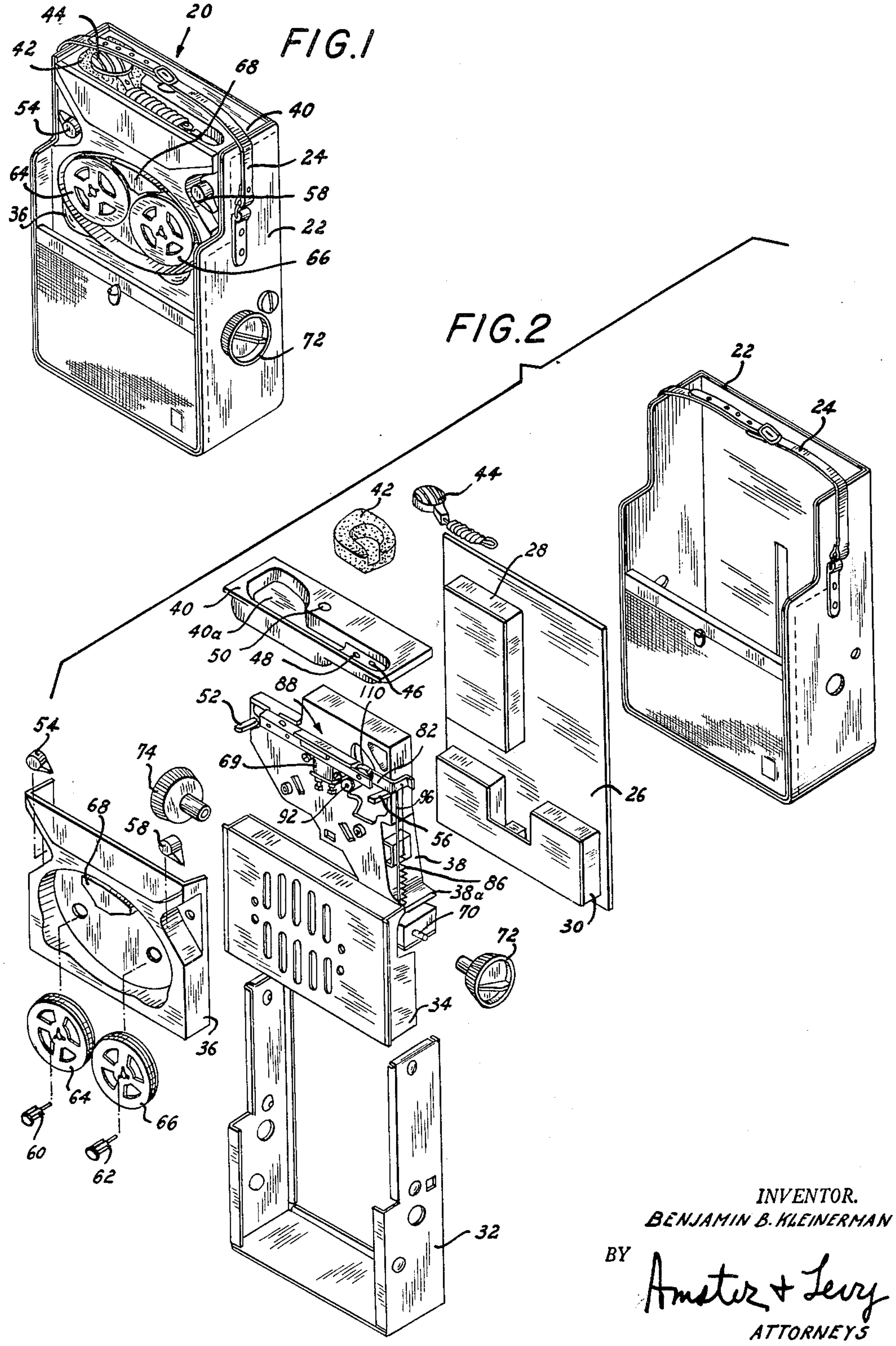
FIG. 1 is a perspective view of a portable tape recorder in accordance with the present invention.
FIG. 2 is an exploded view of the tape recorder of FIG. 1 illustrating the structural arrangement of various operating sections thereof.

Referring now specifically to the drawings, FIG. 1 illustrates a portable tape-recorder, generally designated 20, in accordance with this invention. As may be best appreciated from the exploded view of FIG. 2, the tape recorder 20 includes an outer case 22 having secured thereto a carrying strap 24. A battery plate 26 contains conventional batteries of flashlight size in compartments 28 and 30 for providing a D.C. power supply for the electro-acoustical system of the tape recorder 20, and is designed to be mounted along the rear wall of the carrying case 22. An inner housing 32 is designed to be fastened to the front surface of the battery plate 26 and to fit, together with the battery plate 26, into the outer casing 22. The lower front portion of the inner housing 32 is adapted to receive a chassis 34 upon which are mounted the electro-acoustical components of the tape recorder 20, including an internal speaker. Mounted above the chassis 34 along the front portion of the inner housing 32 there is mounted a reel housing 36 which functions as a front covering panel for the tape recorder 20. Behind the reel housing 36 is mounted a mechanical assembly mount 38 to which are secured the tape drive and functional phase shift components of the tape recorder 20. Above the reel housing 36 and the mechanical assembly mount 38 is mounted a microphone disc 40 which serves as a top wall for the tape recorder 20 and which is formed with a recess 40a which receives an impact-absorbing rubber cushion 42 in which nests a microphone 44. An input jack 46 is provided on the plate 40 for connecting the microphone 44 or an equivalent device to the input of the electro-acoustical system of the tape recorder 20, and an output jack 48 is also provided which enables the audio output of tape recorder 20 to be fed to an external speaker or to the microphone 44 which can thus be used as an earphone for private listening. A recording level indicator light 50 is also mounted on the plate 40. A function change shaft 52 projects forwardly from the mechanical assembly mount 38 through an opening in the reel housing 36 and is operated by a function change knob 54. A similar shaft 56 projects forwardly from the other side of the mechanical assembly mount 38 through a corresponding opening in the reel housing 36 and is operable to change the tape drive speed by means of a knob 58. Reel drivers 60 and 62 also project through openings in the reel housing 36 and engage rotatable shafts on the mechanical assembly mount 38 for rotation of a supply reel 64 and take-up reel 66 respectively located outwardly of reel housing 36. The reel housing 36 is formed with a transducer head cover 68 over which the tape is threaded from the supply reel 64 to the take-up reel 66. An on-off shaft 70 projects from the mechanical assembly mount 38 through the side of the inner housing 32 and outer casing 22 and is operated by a knob 72 to turn the device on or off. A volume control knob 74 is mounted on the opposite side of the tape recorder 20 to operate a similar projecting shaft.

Figure 3:
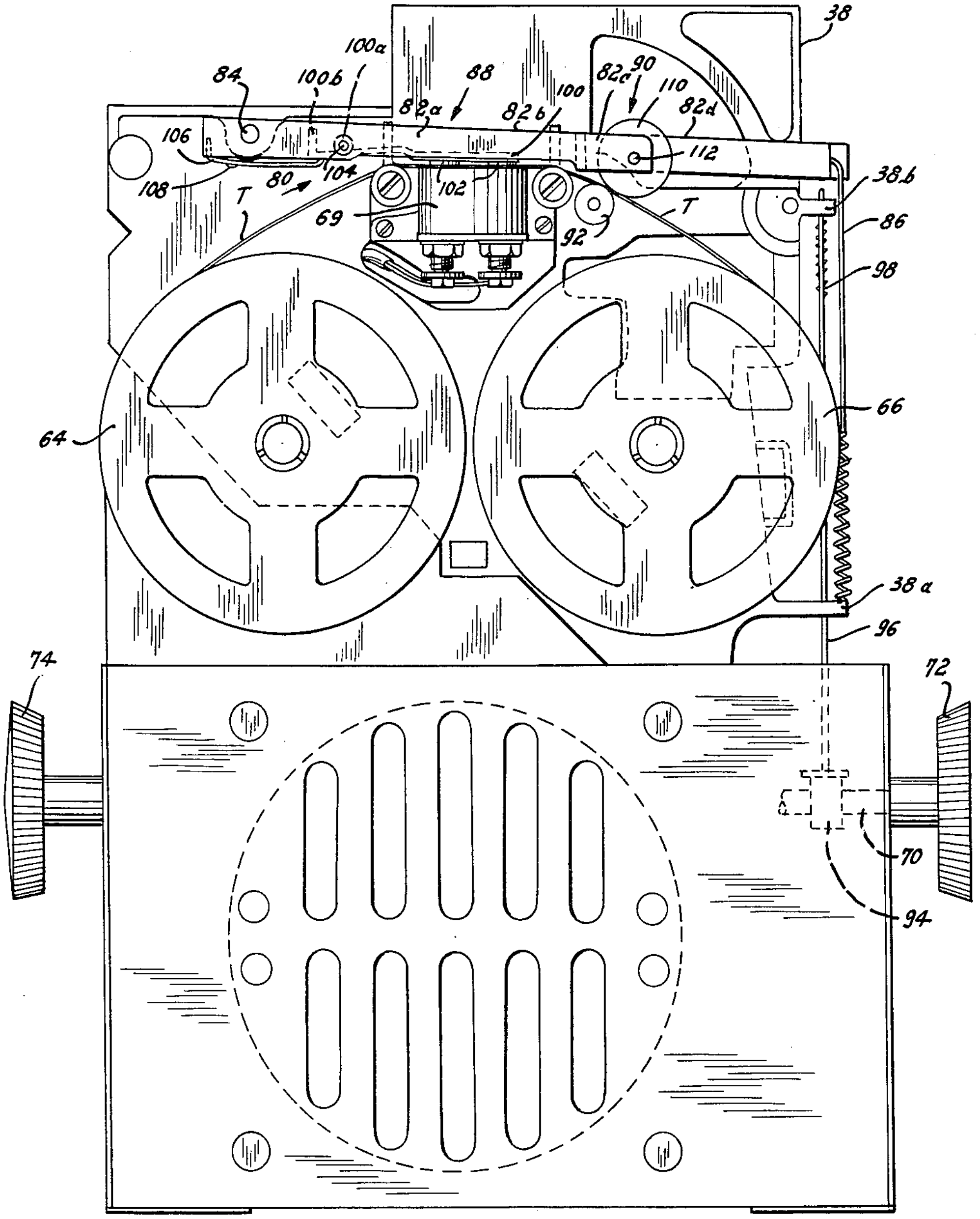
FIG. 3 is a front elevational view of the tape recorder of FIGS. 1 and 2 with the reel housing thereof removed, illustrating the pressure arm thereof in the record-playback operating position.

Turning now to the detailed operation of the tape recorder 20, FIG. 3 illustrates the upper front panel of the tape recorder 20 with the reel housing 36 thereof removed to reveal the transducer head 69 and the pressure arm assembly which cooperates to feed the recording tape T from the supply reel 64 past the transducer head 69 to the take-up reel 66. The transducer head 69, as is well understood, includes a record-playback head and an erase head mounted rearwardly of the record-playback head relative to the direction of tape travel indicated by the arrow 80. The pressure arm assembly includes a pressure arm 82 and a pivot 84 mounting the pressure arm 82 for pivotal movement thereabout. A coil spring 86 is tensed between the free end of pressure arm 82 and a stud 38a of the mechanical assembly mount 38 to bias the pressure arm 82 for pivotal movement towards the transducer head 69. The limit of the movement of pressure arm 82 toward the transducer head 69 defines the operating position assumed by the pressure arm 82 during the record and playback operating phases. When the pressure arm 82 is in the operating position a pressure pad assembly generally designated 88 is effective to press the recording tape T into operative engagement with the transducer head 69 in accordance with the requirements of magnetic record, playback, and erase operations, and a pressure roller assembly generally designated 90 is effective to press the recording tape T into operative engagement with a rotating capstan 92 so that the latter drives the recording tape T past the transducer head 69. When it is desired to retract the pressure arm 82 from its operating position, this may be accomplished by appropriate rotation of knob 72 to rotate the shaft 70. The latter has a cam 94 which exerts an upward force in response to such rotation upon a retraction arm 96 which is vertically movable through openings in the stud 38a and a further stud 38b of the mechanical assembly mount 38. Upward movement of retraction arm 96 engages the free end of pressure arm 82 to raise the pressure arm from the operating position to which it is biased by spring 86. When knob 72 is rotated in the direction to lower cam 94 and restore pressure arm 82 to its operating position, as best seen in the side view of FIGS. 5 and 6, a spring 98 mounted between the stud 38b and a curled tip 96a of the retraction arm 96 is effective to bias the retraction arm 96 downwardly to its normal position. FIGS. 4 and 6 illustrate the cam 94 and retraction arm 96 in position to raise the pressure arm 82, while FIGS. 3 and 5 illustrate the pressure arm 82 in its operating position and the retraction arm 96 returned to its rest position by spring 98.

Figures 4, 5, 6:
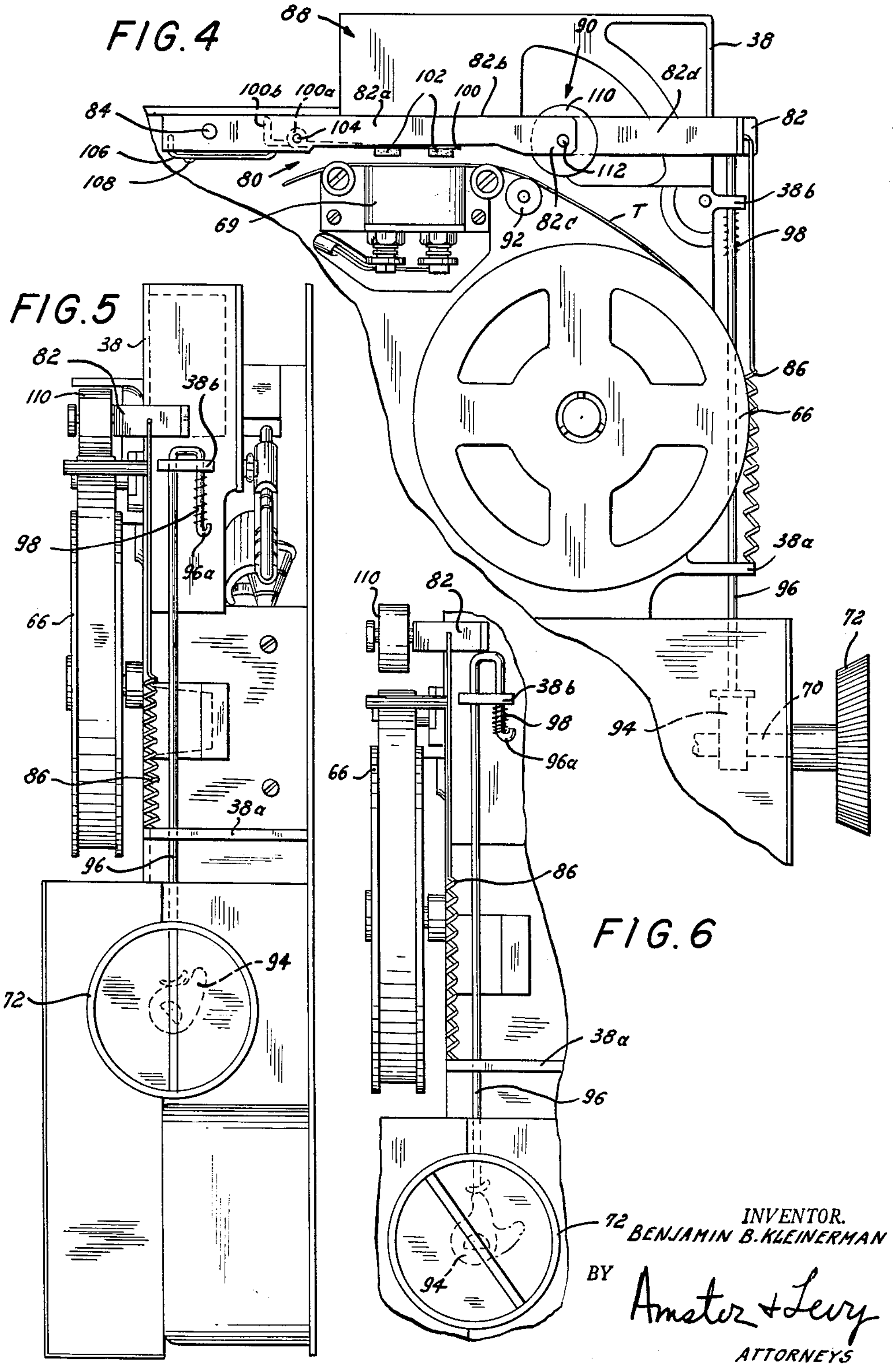
FIG. 4 is a front elevational view of the tape recorder of FIGS. 1–3 with the reel housing removed corresponding to the view of FIG. 3 but illustrating the pressure arm as retracted from its operating position.
FIG. 5 is a side elevational view of the tape recorder of FIGS. 1–4 with the side wall thereof removed, illustrating the mechanism for retracting the pressure arm from its operating position.
FIG. 6 is a side elevational view of a portion of the tape recorder of FIGS. 2–6 corresponding to the view of FIG. 5 and illustrating the pressure arm retraction mechanism in the process of retracting the pressure arm from its operating position.

The pressure pad assembly 88, as best seen in FIGS. 3 and 4, includes a pressure pad holder 100 having pressure pads 102 mounted thereon for pressing the recording tape T against the transducer head 69. The pressure pad holder 100 consists of a wire curled into a loop 100a, and a pivot pin 104 passes through the loop 100a and is secured at its ends to the side surfaces 82a of the pressure arm 82 to mount the pressure pad holder 100 for pivotal movement thereabout. An upwardly projecting heel 100b of the pressure pad holder 100 strikes against the dorsal surface 82b of the pressure arm 82 to limit the aforesaid pivotal movement of the pressure pad holder 100. A pressure pad leaf spring 106 is riveted at one end by means of a rivet 108 to the rear end of pressure arm 82 and engages the pressure pad holder 100 on the opposite side of pivot 104 from the pressure pads 102 to bias the holder 100 for pivotal movement about the pivot 104 in the direction to move the pressure pads 102 towards the transducer head 69. The projecting heel 100b is sized so that it is spaced downwardly from the dorsal surface 82b of the pressure arm 82 whenever the latter is in its operating position and the pressure pads 102 mounted on the pressure pad holder 100 are pressing the recording tape T against the transducer head 69. As the pressure arm 82 is retracted upwardly from its operating position the leaf spring 106 biases the rearward end of the pressure pad holder upwardly about the pivot 104, causing the forward end of the pressure pad holder 100 to rotate downwardly relative to the pressure arm 82 to hold the pressure pad 102 down so that it continues to press the recording tape T against the transducer head 69 during an initial phase of the retraction of the pressure arm 82. The heel 100*b* is short enough to allow this initial phase to continue until in response to retraction of the pressure arm 82 the pressure roller assembly 90 has ceased to press the recording tape T into driving engagement with the rotating capstan 92, and until the various moving parts of the tape drive loose their momentum and come to rest under the influence of various braking means which will subsequently be described. The recording tape T is thus pressed against the transducer head 69 as a means of immediately terminating the travel of the recording tape T during this initial phase of the retraction of pressure arm 82 before the braking means have taken effect. Subsequently, the heel 100*b* contacts the dorsal surface 82*b* of the pressure arm 82 to terminate the pivotal movement of the pressure pad holder 100 relative to the pressure arm 82. During the remaining phase of the retracting motion of pressure arm 82, therefore, the pressure pad holder 100 is retracted along with the pressure arm 82, and comes out of engagement with recording tape T.

The pressure roller assembly 90 comprises an elastic tire 110 mounted on a pivot 112 extending between laterally spaced forks 82*c* and 82*d* at the free end of the pressure arm 82. When the pressure arm 82 is in its operating position the elastic tire 110 presses the recording tape T into driving engagement with the rotating capstan 92 and rotates therewith as the recording tape T is fed past by the rotation of capstan 92. As long as the capstan 92 and elastic tire 110 are rotating, the mutual pressure exerted therebetween will not produce any lasting deformation of the elastic tire 110, since the point at which pressure is exerted thereon by the capstan 92 will be rapidly traversed about the circumference of the elastic tire 110. However, if the elastic tire 110 were left in pressure contact with the capstan 92 while the latter was not rotating, a lasting deformation of the elastic tire 110 might be produced. Accordingly, the on-off shaft 70 upon which the pressure arm retraction cam 94 is mounted is also employed as the switching shaft which operates an on-off switch for the energizing circuit of the electric motor which drives capstan 92. The retraction cam 94 and on-off switch for the tape recorder motor are ganged on the on-off shaft 70 in such manner that the pressure arm 82 is retracted to relieve the pressure on elastic tire 110 concurrently with de-energization of the tape recorder motor so as to relieve the pressure against the elastic tire 90 when the capstan 92 is stationary, and thus prevent lasting deformation of the elastic tire 110.

Figure 7:
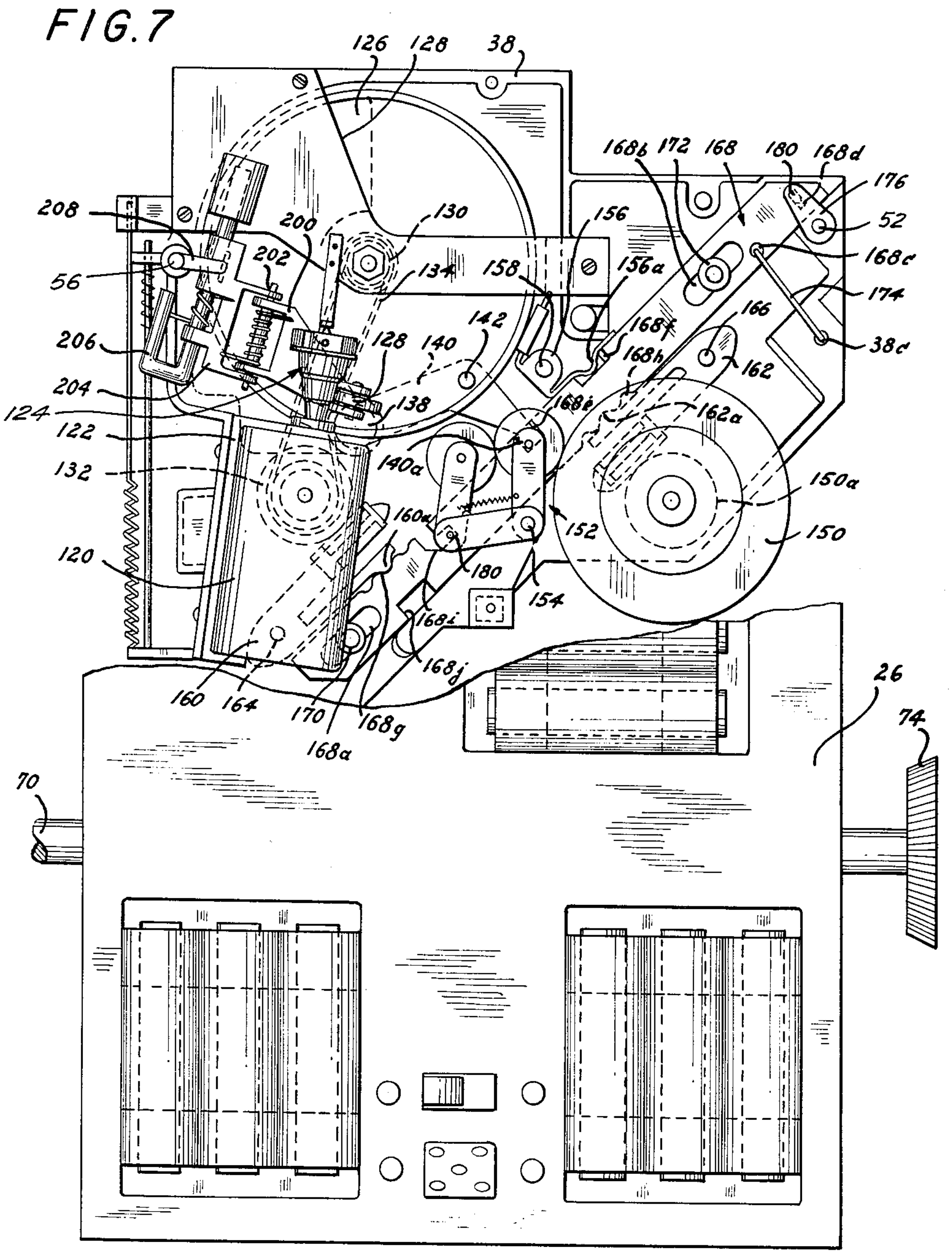
FIG. 7 is a rear elevational view of the tape recorder of FIGS. 1–6 with the rear wall thereof broken away, illustrating various mechanical components thereof in the record-playback position.

The electric motor, designated 120, as best seen in the rear view of FIG. 7, is mounted on a motor bracket 122 and when energized is operable to rotate a motor spindle 124. A flywheel 126 is rotatably mounted between the mechanical assembly mount 38, and a flywheel bearing bracket 128. Power is transmitted from the motor spindle 124 to the flywheel 126 by means of a transmission wheel 128 positioned in driving contact with both the motor spindle 124 and the flywheel 126. All further rotating members of the tape recording 20 are driven from the rotating flywheel 126. For example, the rotating capstan 92 which feeds the recording tape T past the transducer head 69 is mounted on a common shaft with the flywheel 126 for rotation therewith. Also mounted on the aforesaid common shaft and rotatable with the flywheel 126 is a flywheel pulley 130. A take-up pulley 132 is mounted on a common shaft with the take-up reel 66 and is rotatable therewith. A stretchable spring transmission belt 134 passes over both the flywheel pulley 130 and take-up pulley 132 to transmit the rotation of flywheel 126 to the take-up reel 66. The purpose of providing a stretchable spring type of transmission belt 134 is to enable the tension thereof to be varied as a means of adjusting the speed of the take-up pulley 132 in accordance with the varying requirements of different operational phases of the tape recorder 20. For example, it is desired to rotate the take-up reel 66 very fast during the fast-forward phase and less fast during the record and playback phase. It is further desired to transmit no rotation at all to the take-up reel 66 during the rewind phase. Accordingly, there is provided an idler pulley 138 which is movable to adjust the tension of the spring belt 134 in accordance with the aforesaid requirements. The idler pulley 138 is rotatably mounted on a tension adjustment arm 140 which is mounted for a pivotal movement on a pivot 142 to move the idler pulley 138 for the purpose of adjusting the tension of belt 134. During the rewind phase power is transmitted from the flywheel 126 to a rewind wheel 150 which is mounted on a common shaft with supply reel 64 and is rotatable therewith. A rewind transmission assembly 152 is mounted on a pivot 154 for movement into a position for making driving contact with both the flywheel 126 and th erewind wheel 150. Brakes 160 and 162 are provided for braking the motion of the take-up pulley 132 and the rewind wheel 150 respectively. The brake 160 is mounted on a pivot 164 and can be rotated thereabout into braking engagement with the take-up pulley 132. Brake 162 is mounted on a pivot 166 and can similarly be rotated thereabout into braking engagement with an auxiliary braking surface 150*a* of the rewind pulley 150.

All of the aforesaid mechanisms are designed for changing the operational phase of the tape recorder 20 and may be operated by a single control bar 168 of novel construction which is slidably mounted by means of posts 170 and 172 which protrude through elongated slots 168*a* and 168*b* respectively for sliding motion along the longitudinal axis of the control bar 168 and through a succession of operating positions. In the view of FIG. 7 the control bar 168 is shown in its record and playback operating position. A control bar leaf spring 174 is fixed in a detent 38*c* formed in the mechanical assembly mount 38 and is engaged at the other end by a detent 168*c* formed in the control bar 168. The leaf spring 174 is unstressed when the control bar 168 is in the record-playback operating position of FIG. 7, but becames deformed to one side or another as the control bar 168 is moved longitudinally toward either of its opposed ends to shift the tape recorder 20 from one operating phase to another. An actuating dog 176 is mounted on the function change shaft 52 for rotation therewith and has a pin 180 which projects into a detent 168*d* of the control bar 158 to slide the control bar longitudinally on the posts 170 and 172 in response to rotation of the actuating dog 176. An actuating head 140*a* of the tension adjustment arm 140 is engaged within a detent 168*e* of the control bar 168 to pivot the tension adjustment arm 140 about the pivot 142 in response to sliding movement of the control bar 168. A dwell projection 168*f* engages a camming projection 156*a* on the flywheel brake 156 to force the brake 156 to pivot about pivot point 168 and to come into a momentary braking relation with the flywheel 126. The dwell projection 168*f* extends in a transverse direction from the control bar 168, in FIG. 7 in a direction towards the viewer. Thus as the control bar is moved toward the post 170 and away from post 172 from the position as shown in FIG. 7, the dwell projection 168*f* comes into contact with projection 156*a* and thus brakes the flywheel 126. In the record and playback position shown in FIG. 7 the projection 156*a* is in a non-operating position down along the side of control bar 168. Braking contact is made only during the momentary interval when the control bar 168 is shifted from the record and play-back position to the fast-forward position. Undulating camming surfaces 168*g* and 168*h* are formed on the control bar 168 and cooperate with camming projections 160*a* and 162*a* of the take-up pulley brake 160 and the rewind wheel brake 162 respectively to move the latter into braking relationship to the take-up pulley 132 and rewind wheel 150 in accordance with operational requirements. The control bar 168 is further formed with a channel 168*i* which engages a pin 180 projecting thereinto from the rewind transmission assembly 152. Motion of the control bar 168 is effective to engage the pin 180 for moving the rewind transmission assembly 152 either into or out of driving engagement with the flywheel 126 and the rewind wheel 150, depending upon a direction of motion of the control bar 168.

Figures 8, 9, 11:
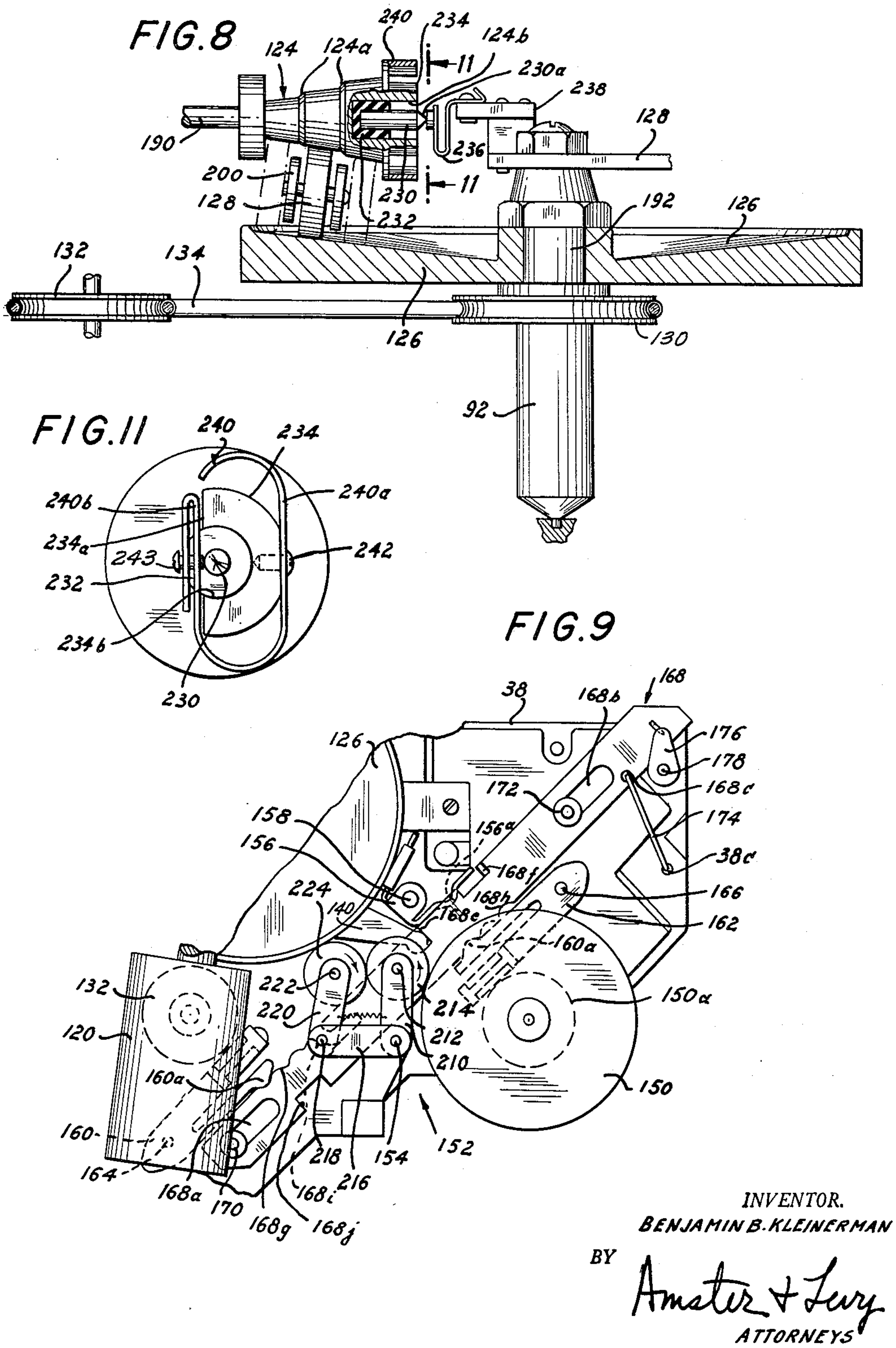
FIG. 8 is an elevational view with parts sectioned, of the variable speed drive sub-assembly of the tape recorder of FIGS. 1–7.
FIG. 9 is a rear elevational view of a portion of the tape recorder of FIGS. 1–8 corresponding to the view of FIG. 7, and illustrating various mechanical components thereof in the rewind position.
FIG. 11 is a front elevational view of the motor pulley and motor governor of the tape recorder of FIGS. 1–10.

In the record-playback position of the control bar 168 illustrated in FIG. 7 it will be appreciated that the tension adjustment arm 140 is in a mid-way position to set the tension of belt 134 to a medium level, while the flywheel brake 156, the take-up pulley brake 160, and the rewind wheel brake 162 are in non-braking relationship to the flywheel 126, take-up pulley 132, and rewind wheel 150 respectively. The rewind transmission assembly 152 is pulled back out of engagement with the flywheel 126. Thus, in accordance with the operational requirement of the record-playback phase of tape recorder operation, take-up reel 132 is being driven at a medium speed owing to the medium tension exerted on belt 132 by idler pulley 138, and brake 160 is not braking the motion of take-up pulley 132. Similarly, the brake 162 is not braking the motion of rewind wheel 150, and the latter is free to rotate under the tension of recording tape T as it is unwound from the supply reel 64. The rewind assembly 152 is of course retracted from driving engagement with the flywheel 126 so as not to drive the rewind wheel 150 in the opposite direction as though for rewinding the recording tape T. The flywheel brake 156 is also retracted so as not to retard the motion of flywheel 126 except when shifting to the rewind operating phase. In the view of FIG. 9 the control bar 158 is seen in the rewind operating position, the actuating dog 176 having been rotated clockwise to slide the control bar 168 upwardly relative to the posts 170, 172. In this operating phase it is seen that the camming projection 156*a* is again in a non-operative position such that it is not cammed up by dwell projection 168*f*. Therefore, the brake 156 is not in contact with the flywheel 126. The rewind transmission assembly 152 is rotated clockwise about pivot 154 to make driving engagement with flywheel 126 and rewind wheel 150 for rotating the latter to drive the supply reel 64 for rewinding the recording tape T. The tension adjustment arm 140 is rotated counterclockwise about pivot 142 to relax the tension of belt 134 to a minimal level and effectively disrupt the driving connection between flywheel 126 and take-up pulley 132 so that the take-up reel 66 may spin freely to allow recording tape T to be unwound therefrom during the rewind operation. Upon rotation of the actuating dog 176 counterclockwise to slide the control bar 168 downwardly to the limit of its travel in that direction, the control bar would then be in the fast-forward operating position, retracting the rewind transmission assembly 152 from driving relationship with the flywheel 126, pivoting the tension adjustment arm 140 clockwise about pivot 142 to exert maximal tension on the belt 134 so that the take-up pulley 132 is driven at a maximal speed in accordance with fast-forward requirements and again allowing the flywheel brake 156 to be in a non-operating position, the camming projection 156*a* not being in contact with the dwell projection 168*f*. It will be appreciated that as the control bar is shifted to the fast-forward position the dwell projection 168*f* cams the camming projection 156*a* to bring the brake into momentary contact with the flywheel 126 to stop same before the shift is accomplished to fast rewind. Thus the inertia forces are eliminated. It will be further appreciated that undulating camming surfaces 168*g* and 168*h* of the control bar 168 each consists of three dwell recesses interspersed with camming rises, so that the brake 160 and 166 are operated to brake the motion of takeup pulley 132 and rewind wheel 150 respectively only when the control bar 168 is in transit between any two adjacent operating positions. In this manner the tape drive is brought to a halt during shifting of the operating phase of tape recorder 20. A further detent 168*j* may be formed in the control bar 168 for the purpose of operating a conventional muting switch (not shown) when the control bar 168 is in either of its extreme positions, that is, either the rewind operating position or the fast-forward operating position, so as to mute the unintelligible noises which could otherwise be made when the tape is driven at an abnormal speed or an abnormal direction past transducer head 69.

FIG. 8 illustrates in greater detail the drive train of tape recorder 20, showing that the motor spindle 124 is driven directly from the drive shaft 190 of the electric motor 120, and in turn drives speed change transmission wheel 128 to rotate flywheel 126. It is seen that the flywheel 126 and the capstan 92 are mounted upon a common shaft 192 so that rotation of the flywheel 126 is effective to rotate capstan 92 for feeding the recording tape T past the transducer head 69. It is also seen that the flywheel pulley 130 is mounted upon the shaft 192 and is connected to take-up pulley 132 by means of spring belt 134. It will be appreciated that the edge of transmission wheel 128 which is closer to the axis of rotation of flywheel 126 will be in contact with a more slowly traveling annular band of the contact face 126*a* of flywheel 126 than the edge of transmission wheel 128 which is further from the axis of rotation of flywheel 126. This speed differential between the inner and outer edges of transmission wheel 128 will cause those edges to wear unevenly. In order to alleviate the problem of uneven wear, therefore, it is a further novel feature of this invention to provide a contact face 126*a* for the flywheel 126 which is of conical configuration so that, as seen in the sectioned view of FIG. 8, the contact face 126*a* slants from the outer perimeter thereof toward the axis of rotation. As a result of this slant, the distance between the outer and inner edges of transmission wheel 128, as measured along a line perpendicular to the axis of rotation, is reduced. Thus, the speed differential between the opposite sides of transmission wheel 128 is reduced, and the wear of those sides will not be quite so uneven.

The drive connection between motor spindle 124 and flywheel 126 by means of transmission wheel 128 is of the variable speed type to enable the tape recorder 20 to be run at three different recording and playback speeds. In order to change the operating speed of the tape recorder 20 the transmission wheel 128 is shifted radially across the contact face 126*a* of the flywheel 126 so as to vary the drive ratio therebetween. The transmission wheel 128 is rotatably mounted between the prongs of a shifting fork 200, best seen in the rear elevational view of FIG. 7. The shifting fork 200 is secured by means of a pin 202 to a slide 204 which is slidably mounted upon a slide bolt 206 and may be moved longitudinally therealong by means of a speed change dog 208 mounted upon the shaft 56. The solid representation of transmission wheel 128 in FIG. 8 shows the latter in its middle position for driving the flywheel 126 at a medium speed, while the broken link representations of transmission wheel 128 in FIG. 8 show the latter in alternative positions on either side of the medium position, to which the transmission wheel 128 may be moved by means of shifting fork 200 to increase or decrease the recording and play-back speed of the tape recorder 20. In order to provide the proper drive ratio between the motor spindle 124 and the flywheel 126 at each of the three speed positions of transmission wheel 128, the motor spindle 124 is formed with three distinct drive segments of different diameter. The boundaries between the drive segments, as a further novel feature of the tape recorder 20, are provided with chamfers 124_a_ which make a gradual transition between the drive segments of the motor pulley 124 and therefore permit the transmission wheel 128 to be more easily shifted across the boundaries between drive segment. The direction of rotation of the motor spindle 124 is counterclockwise as viewed from the top of tape recorder 20, and transmission wheel 128 is thus driven clockwise and is offset from the motor spindle 124 in the proper direction so that the transmission wheel 128 is positioned in self-energizing relationship to the motor spindle 124 by which it is driven and the flywheel 126 which it in turn drives. By self-energizing relationship it is meant that direction of offset of the interengaging rotating members relative to each other is selected in relation to their directions of rotation so that the transmission wheel 128 is urged by the motor spindle 124 into better driving engagement therewith. Thus, as the transmission wheel 128 rotates clockwise it tends to "climb" across the contact face 126_a_ into tighter engagement with spindle 124.

FIGS. 7 and 9 serve best to illustrate a novel self-energizing feature also incorporated in the rewind transmission assembly 152. The rewind assembly includes a first link 210 which is pivotally mounted at one end on the pivot 154 and which rotatably mounts at the other end thereof, by means of a pivot 212, a transmission wheel 214 which during the rewind operating phase makes driving contact with the rewind wheel 150. A transverse link 216 is also pivotally mounted at one of its ends on pivot 154, and at the other end has a pivotal connection by means of a pivot 218 to one end of a second link 220. The other end of link 220 rotatably carries by means of pivot 222 a second transmission wheel 224 which makes driving contact with the perimeter of the flywheel 126 when the rewind assembly 152 is rotated clockwise about the pivot 154 by the control bar 168, this position being illustrated in FIG. 9. A rewind assembly spring 226 is connected between the first link 210 and second link 220 so as to bias the transmission wheels 214 and 224 into driving contact with each other. From an inspection of FIG. 9, and bearing in mind that the direction of rotation of flywheel 126 is counterclockwise with respect to that view, it will be seen that when the assembly 152 is in the rewind position, the transmission wheel 224 is positioned with its center of rotation offset from a line drawn between the center of rotation of flywheel 126 and transmission wheel 214 in the proper direction to cause the transmission wheel 224 to "climb" inwardly toward the flywheel 126 and transmission wheel 214 so as to make better driving contact therewith. Similarly, the transmission wheel 214 is offset from a line drawn between the centers of rotation of transmission wheel 224 and rewind wheel 150 in the proper direction for transmission wheel 214 to "climb" inwardly toward the transmission wheel 224 and rewind wheel 150 for better driving contact therewith. Thus, the geometry of the rewind assembly is such that the positioning of the flywheel 126, rewind wheel 150, and transmission wheels 224 and 214 is selected in relation to their respective directions of rotation to provide a self-energizing relationship amongst all the various transmission components of the rewind drive train.

The tape recorder 20 also includes a novel type of governor which serves to keep the electric motor 120 running at a constant speed even though the voltage put out by the batteries which comprise the D.C. power supply for the tape recorder 20 may be high enough to drive the electric motor 120 at a higher speed. As best seen in the partially sectioned view of FIG. 8, the motor spindle 124 is fabricated of metal and formed with a central bore 124_b_ extending axially inward from the end face thereof. A metallic contact post 230 having an insulative jacket 232 encasing the rear end thereof, and the latter is press fit into the central bore 124_b_ for rotation of the post 230 and jacket 232 with the motor spindle 124. The forwardly directed end of the contact post 230 projects free of the insulative jacket 232 which encases the rearward end thereof. A substantially semi-circular governor block 234 integral with the front face of motor spindle 124 projects forwardly therefrom and is formed with a flat surface 234_a_, as seen in FIG. 11. The central bore 124_b_ formed in the motor spindle 124 extends forwardly through governor block 234 and opens sidewardly through flat surface 234_a_ to form a substantially semi-circular cut-out 234_b_. The insulative jacket 232 about the contact post 230 terminates short of the governor block 234, and the exposed forward portion of the contact post 230 which projects through the semi-circular cut-out 234_b_. The outside diameter of the contact post 230 is smaller than the inside diameter of center bore 234_b_ so that there is a semi-annular clearance space about the external surface of contact post 230 which serves to insulate the latter from the internal surface of semi-circular cut-out 234_b_. The contact post 230 is sized to extend sidewardly somewhat beyond the flat surface 234_a_, and is formed with a forwardly directed contact point 230_a_ which extends beyond the front face of the semi-circular block 234 and is constantly contacted during rotation of the motor spindle 124 by a brush contact 236 mounted on an insulating block 238 which in turn is affixed to the flywheel bearing bracket 128. The contact post 230 is connected through the brush 236 to one side of the energizing circuit of the electric motor 120, and the motor spindle 124 and the semi-circular block 234 which is an integral extension thereof are connected to the other side of the energizing circuit of electric motor 120, with the insulative jacket 232 and the semi-annular air space surrounding contact post 230 serving to prevent electrical communication therebetween. A governor spring 240 is provided for the purpose of normally making electrical contact between the semi-circular block 234 and the center post 230. One arm of the governor spring 240_a_ is curved to fit on the back or outward facing side of insulating jacket 232 and is attached thereto by means of a screw 242 passing through a clearance hole in arm 240_a_. The other arm 240_b_ of the governor spring 240 is bent into a hair pin shape such that it is folded back upon itself. This double section is located on the side of the contact post 230 opposite the insulating jacket 232. A tapped hole goes through both layers of arm 240_b_ and a speed adjustment screw 243 is threaded into this tapped hole. The double layer acts as a locking device for the screw 243. When the speed of the electric motor 120 does not exceed a critical limit the speed adjustment screw 243 in the freely movable arm 240_b_ of governor spring 240 contacts the portion of contact post 230 which projects sidewardly beyond the flat surface 234_a_ to make the electrical contact necessary to complete the energizing circuit of the electric motor 120. However, the freely movable arm 240_b_ is sufficiently flexible so that when the speed of electric motor 120, and hence of motor spindle 124, exceeds a critical limit the effect of the centrifugal force on governor spring 240 rotating with the motor spindle 124 is sufficient to force freely movable arm 240_b_ outwardly from contact post 230 to break the energizing circuit of the electric motor 120 and slow the latter down until it returns substantially to the critical speed, at which point the freely movable arm 240_b_ will resiliently return to a position when the speed adjustment screw 243 is again in electrical contact with the post 230. By thus shutting off the power supply of electric motor 120 above the critical speed and turning it back on again when the critical speed is resumed, the governor spring 240 forces the electric motor 120 to stabilize its speed of rotation about a desired value. Adjustment of the governing device is achieved by means of the speed adjustment screw 243. When it is screwed in as far as it will go a relatively high speed is maintained because a relatively high centrifugal force is necessary to bend spring 240 far enough to break electrical contact with contact post 230. Conversely, when the speed adjustment screw 243 is set in a position wherein it is not projecting below the arm 240*b* a relatively low speed is maintained since a relatively low centrifugal force is necessary to break the electrical contact. Thus a fine degree of control over the speed of the motor may be maintained.

Figure 10:
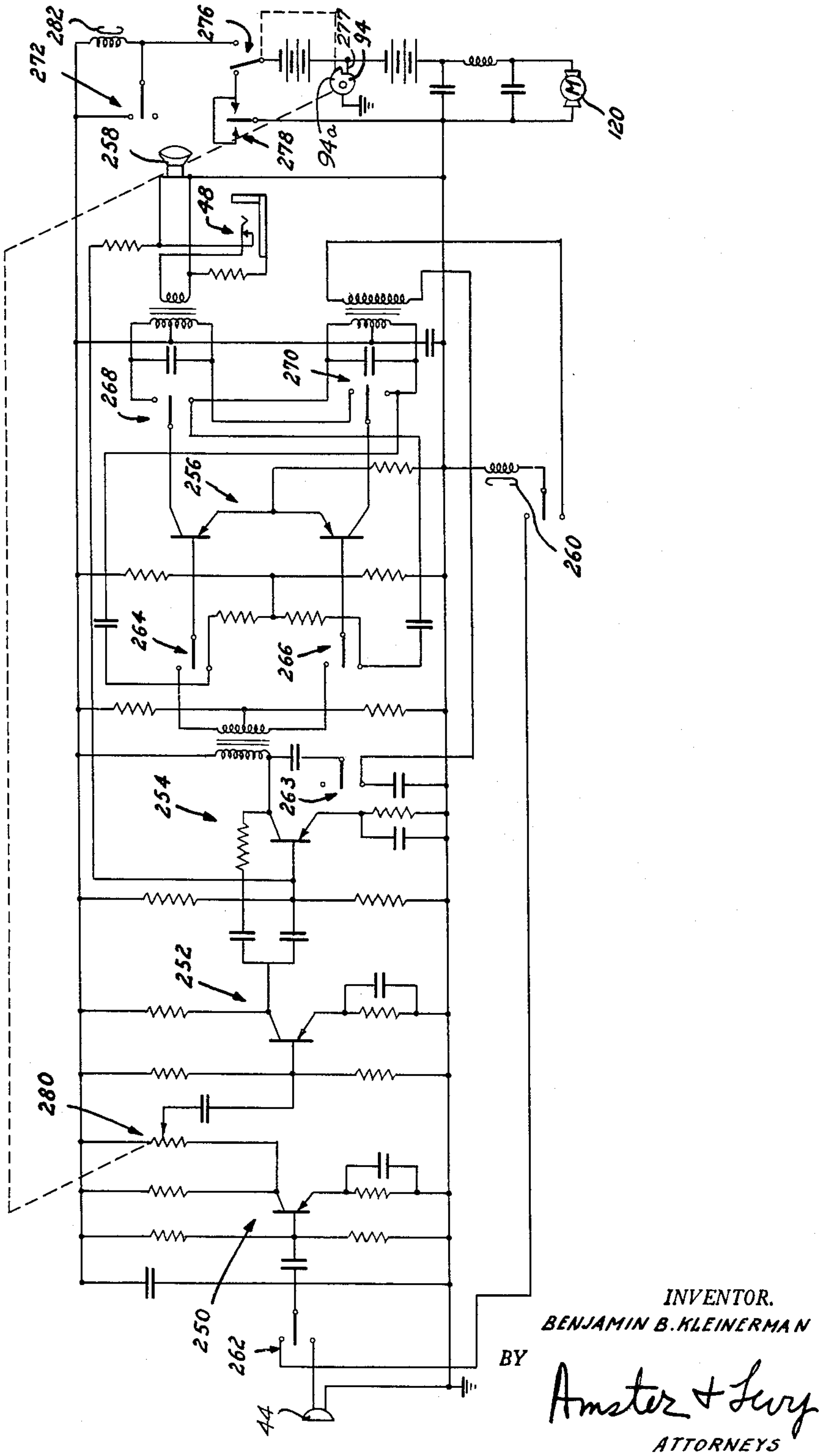
FIG. 10 is a schematic diagram of the electro-acoustical system of the tape recorder of FIGS. 1–9.

FIG. 10 schematically illustrates the circuitry and electro-acoustical components of the tape recorder 20. The numerals 250 and 252 generally designate the two RC-coupled common-emitter stages of a two-stage small signal transistor amplifier. Amplifier 250, 252 is in turn RC-coupled to the driver stage 254 of a transistor power amplifier having push-pull output stage 256. During the playback operational phase the output of stage 256 is applied to internal speaker 258 or alternatively to output plug jack 48 which is of the open circuit type so that insertion of a plug thereinto will automatically disconnect the speaker 258. The input during the playback operating phase is taken from a record and playback head 260 and applied across a capacitor to the base of transistor stage 250. In order to connect all the various electro-acoustical components in accordance with the requirements of the playback phase, it is necessary that all the single pole, double throw switches 262–272 be flipped to the upper terminal thereof, and all the aforesaid switches are ganged on function change shaft 52 for simultaneous operation. When the ganged switches 262–272 are all flipped to the lower terminals thereof a microphone 44 is connected to the amplifier input in place of the record and playback head 260, and the driver stage 254 is disconnected from the output stage 256 and connected instead to the head 260 (now functioning as a record head). The output stage 256 during this phase of the operation of the tape recorder 20 functions as a bias oscillator which is transformer-coupled to provide a high frequency bias which is mixed with the audio output of driver stage 254 to achieve a more linear response as is well understood in magnetic tape recording. Switch 276 is not ganged with the other single pole, double throw switches in the tape recorder circuit and is simply the on-off switch for the D.C. power supply of the tape recorder 20. The switch 276, which is illustrated in FIG. 10 in the off position, is seen to be ganged with the pressure arm retracting cam 94 as described above to provide a safety interlock which prevents lasting deformation of the elastic tire 110. The cam 94 is grounded, as is one side of the motor 120, a brush 277 completes the energizing circuit thereof by contacting cam 94 as the latter is rotated counterclockwise from the pressure-arm-retracted position illustrated in FIG. 10 to a position in which pressure arm 82 is moved downwardly and the rise portion 94*a* of cam 94 is opposite brush 277 and in contact therewith. Switch 278 is of the momentary "on" type, and can be operated in either direction to energize the electric motor 120 for temporary rewind or fast-forward operation. Variable resistance 280 coupling the amplifier stages 250 and 252 is the volume level and on-off control for the tape recorder audio output, and as illustrated schematically in FIG. 10, is also ganged with the cam 94 so that the audio output of the tape recorder is turned off as the pressure arm 82 is retracted from its operating position so as to prevent the playback of unintelligible sounds during the initial phase retraction of the pressure arm 82. As a further novel feature of the tape recorder 20, there is provided an erase head 282 which is energized by being connected directly in series between the transistor amplifier and the D.C. power supply of the tape recorder 20 so that a steady strong direct current flows therethrough to perform the erase function. It is also seen that switch 272 is connected in parallel across the erase head 282 so that when the ganged switches are flipped upwardly in accordance with playback requirements, the switch 272 short-circuits the erase head 282 and renders it temporarily inoperative. When the ganged switches are flipped to their lower terminals, switch 272 no longer short-circuits erase head 282, and the latter will then erase previous recordings.

It will now be appreciated that a tape recorder in accordance with this invention is extremely compact and light and incorporates transistor circuitry operable from a D.C. power supply and integrated with mechanical components adapted to make the device readily portable, yet this is accomplished without sacrificing many of the quality features expected only in larger and heavier equipment. Consequently, ease of operation of this tape recorder, particularly as regards selection of functional phases, speed shifting, and on-off operation, is at least equal to that of more massive devices, and consistency and smoothness of operation of the drive train are up to the highest standards.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a tape recorder having a transducer head and a capstan adapted to drive a recording tape past said transducer head, a pressure arm extending opposite said transducer head and said capstan, means mounting said pressure arm for pivotal movement toward and away from an operating position adjacent said transducer head and said capstan, pressure roller means positioned on said pressure arm to press said recording tape into driving engagement with said capstan only when said pressure arm is in said operating position, pressure pad means on said pressure arm, means mounting said pressure pad means for movement relative to said pressure arm toward and away from said transducer head, means biasing said pressure pad means toward an engagement position sufficiently near said transducer head to press said recording tape thereagainst when said pressure arm is in said operating position, said biasing means being effective in response to retraction of said pressure arm from said operating position to maintain said pressure pad means in said engagement position during an initial phase of said retraction whereby to brake the motion of said recording tape during said initial phase, and means arranged to limit movement of said pressure pad means toward said transducer head whereby to terminate said initial phase after said pressure roller means has ceased to press said recording tape into driving engagement with said capstan in response to said retraction of said pressure arm.

2. In a tape recorder having a transducer head and a capstan adapted to drive a recording tape past said transducer head, a pressure arm extending opposite said transducer head and said capstan, said pressure arm including a dorsal surface and a pair of opposed sides extending from said dorsal surface toward said transducer head, means mounting said pressure arm for pivotal movement toward and away from an operating position adjacent said transducer head and said capstan, pressure roller means rotatably mounted on said pressure arm to press said recording tape into driving engagement with said capstan only when said pressure arm is in said operating position, a pivot pin extending transversely between said opposed sides, a pressure pad holder pivotally mounted on said pivot pin, a pressure pad mounted on said pressure pad holder at one side of said pivot pin, means biasing said pressure pad holder for pivotal movement about said pivot pin in the direction to move said pressure pad toward an engagement position sufficiently near said transducer head to press said recording tape thereagainst when said pressure arm is in said operating position, said biasing means being effective in response to retraction of said pressure arm from said operating position to maintain said pressure pad in said engagement position during an initial phase of said retraction whereby to brake the motion of said recording tape during said initial phase, and a projection on said pressure pad holder on the opposite side of said pivot pin from said pressure pad arranged to abut against said dorsal surface to limit movement of said pressure pad toward said transducer head whereby to terminate said initial phase after said pressure roller means has ceased to press said recording tape into driving engagement with said capstan in response to said retraction of said pressure arm.

References Cited in the file of this patent

UNITED STATES PATENTS

| | | |
|---|---|---|
| 1,178,834 | Beland | Apr. 11, 1916 |
| 1,361,466 | Kenworthy | Dec. 7, 1920 |
| 2,189,634 | Hanna et al. | Feb. 6, 1940 |
| 2,231,439 | Dudenhousen | Feb. 11, 1941 |
| 2,590,665 | Williams | Mar. 25, 1952 |
| 2,645,495 | Nelson | July 14, 1953 |
| 2,687,881 | Barany et al. | Aug. 31, 1954 |
| 2,719,884 | Reed et al. | Oct. 4, 1955 |
| 2,728,577 | Barany | Dec. 27, 1955 |
| 2,751,438 | Baer | June 19, 1956 |
| 2,864,894 | Dale et al. | Dec. 16, 1958 |
| 2,898,055 | Genning et al. | Aug. 4, 1959 |
| 2,904,275 | Selsted et al. | Sept. 15, 1959 |